P. L. HEDGES.
TIRE.
APPLICATION FILED APR. 19, 1918.
1,295,494. Patented Feb. 25, 1919.
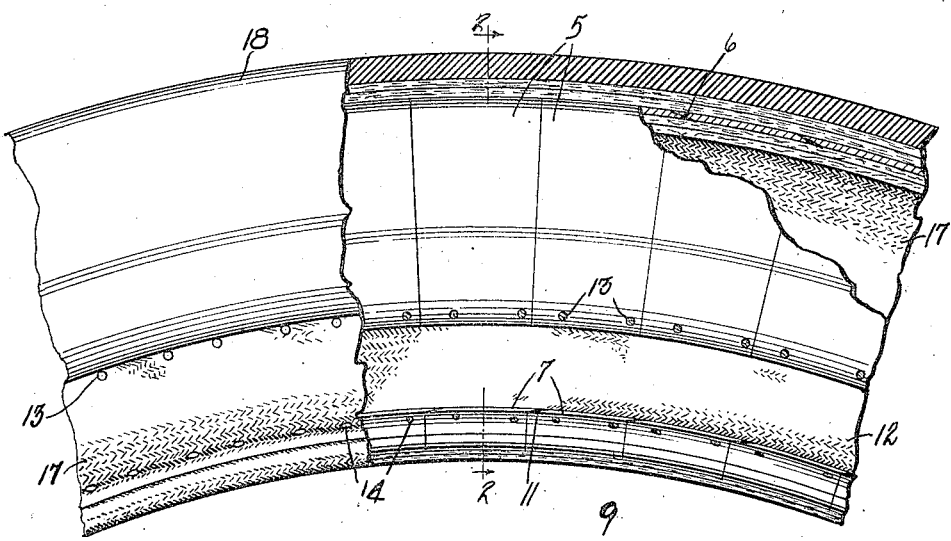
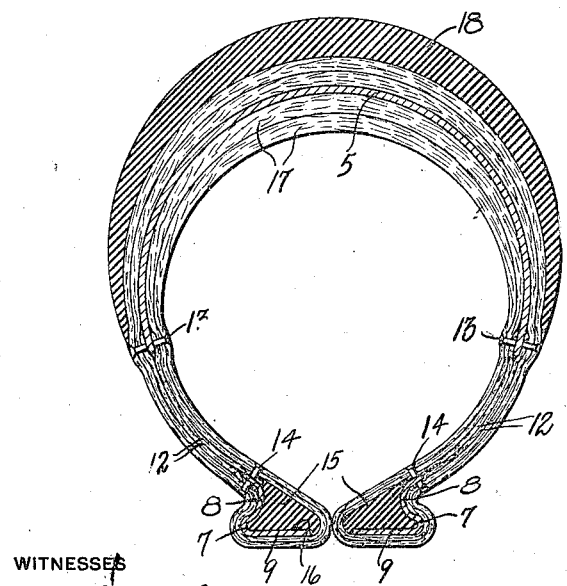
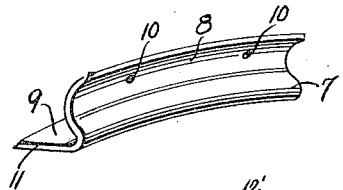
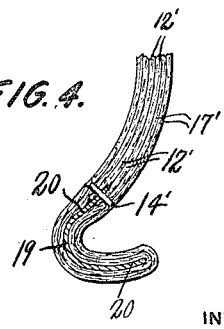
INVENTOR
Perley L. Hedges
BY
ATTORNEY
WITNESSES

UNITED STATES PATENT OFFICE.

PERLEY L. HEDGES, OF MATTOON, ILLINOIS.

TIRE.

1,295,494.　　　　Specification of Letters Patent.　　Patented Feb. 25, 1919.

Application filed April 19, 1918.　Serial No. 229,603.

*To all whom it may concern:*

Be it known that I, PERLEY L. HEDGES, a citizen of the United States, residing at Mattoon, in the county of Coles and State of Illinois, have invented certain new and useful Improvements in Tires, of which the following is a specification.

This invention is a tire and has special reference to internal armor for tires.

One object of this invention is the production of a device which will prevent puncturing of the inner tube and will also eliminate blow-outs.

Another object of this invention is the production of a tire wherein breaker plates are employed, the edges of the breaker plates being beveled to overlap each other, thus presenting an even tread along the series of plates, although the plates will permit of contraction or expanding of the tire as weight is applied thereto.

Another object of this invention is the production of a tire wherein bead plates are employed for reinforcing the beads of the tire, and also preventing rim cutting.

Another object of this invention is the production of simple and efficient means for connecting the breaker plates to the bead plates.

Broadly stated, this invention consists of a plurality of breaker plates having overlapping beveled edges, a plurality of bead plates having overlapping beveled edges, fabric strips connecting the breaker plates to the bead plates and a casing consisting of beads having a shoe thereon positioned upon said plates.

One practical form of construction and assembly of the present invention will be hereinafter described and is illustrated in the accompanying drawing, in which—

Figure 1 is a side elevation of the tire, partly broken away to illustrate the assembly of the several parts.

Fig. 2 is a section taken on the line 2—2 of Fig. 1.

Fig. 3 is a detail of one of the bead plates and

Fig. 4 is a fragmentary sectional view through a slightly modified form of a bead.

In the preferred embodiment of the present invention, about to be described, it will be seen that the breaker plates 5 are substantially semi-circular and are comparatively narrow in cross section. These breaker plates are positioned side by side and have beveled edges 6 engaging each other, as shown in Fig. 1. Thus it will be seen that the breaker plates will form a continuous internal protector which will shield the inner tube against puncture and also prevent blow-outs. From the beveled overlapping construction of the side edges of the plates, it is obvious the tire may expand or contract as the same rotates, as these beveled edges will slide upon each other, although they will not permit the edges of the plates to disengage each other.

The bead plates 7 are also formed of blank strips of material and have a concaved portion 8 from which extends the inwardly bent bearing flange 9. The concaved portion 8 of the bead plate is provided with openings 10 for purposes to be hereinafter set forth. These bead plates are also provided with overlapping beveled edges 11, as shown in Fig. 1, thus permitting the plates to form a continuous bearing surface upon each side of the tire, thus permitting of expansion and contraction of the tire without disengagement of the plates. A plurality of fabric strips 12 have their ends parted and resting upon opposite sides of the inner ends of the breaker plates 5, thus permitting the retaining rivets 13 to be passed through the side edges of the fabric strips 12 and also through the ends of the plates 5, thus fixing these fabric strips upon the plates. The body portions of these fabric strips rest against each other as illustrated clearly in Fig. 2. The remaining side end portions of the fabric strips 12 however, are spread apart, as also illustrated in Fig. 2 to engage the concaved portions 8 of the plates 7. Retaining rivets 14 are passed through the last mentioned side edges of the fabric strips 12 and also through the openings 10 formed in the bead plates 7, thus anchoring these bead plates upon these strips.

Any suitable form of core 15 may be placed upon each side of the tire to engage the bead plates 7 as illustrated in Fig. 2. These cores may be formed of rubber, cork or any other suitable material, without departing from the spirit of the present invention. It will be noted that the cores 15 are recessed as indicated at 16, thus allowing the bearing flanges 9 of the bead plates 7 to fit therein and thus form an even outer surface around each bead of the tire.

The cores are so formed as to conform in contour to the inner portions of the bead plates, as will be seen by referring to Fig. 2.

Several plies of fabric material 17 may be placed upon the inner and outer surfaces of the breaker plates 5 and these plies of fabric material 17 may be extended to be engaged by the rivets 13 and 14, thus being held against shifting. It will also be noted that these plies of material extend continuously around the tire and for this reason fit upon the fabric strips 12 and also around the bead plates 7 and the cores 15 thus firmly holding the cores against displacement. The shoe 18 may then be placed upon the fabric plies 17, as shown in Figs. 1 and 2, thus forming a complete internally armored outer casing. It will be noted that the fabric plies 17 may be increased in thickness in alinement with the tread of the tire although they may be reduced in thickness adjacent the beads of the tire, thus forming comparatively small although strong beads for easy engagement with the rim of the wheel.

Attention is now invited to the construction of the modified form of the bead, as illustrated in Fig. 4. In this figure it will be noted, the bead plate comprises a curved inner portion 19 having diverging portions 20 leading therefrom. The fabric strips 12′ are connected to the bead plate by means of rivets 14′ while it will also be noted that the fabric strips 17 extend around the bead plate for incasing the same and at the same time form a reinforced bead. Owing to the specific construction of the bead plate, it will be seen that it has an outwardly extending portion which will engage the rim of a wheel for holding the tire against displacement. This form of the invention is in all respects similar to the preferred form, with the exception of the detailed construction of the bead plate, although the other construction of elements used in connection with the bead plate and assembly thereof are in all respects similar to the preferred form.

From the foregoing description it will be seen that a tire has been produced, wherein the breaker plates will fit upon each other and permit of the contraction and expansion of the tire without disengaging each other and thus it will be impossible for sharp elements to cut through the tire and injure the inner tube, as inward movement of such elements is limited upon engagement with one of the plates. Furthermore, it is intended to have the plates of resilient metal, which obviously will have a springy action and will yield which will further prevent the passage of elements therethrough. Also these plates will prevent stone bruises from injuring the tire to such an extent as to cause a blow out and in this way blow outs are prevented. It should also be noted that the bead plates are carried at points where the rim engages the casing and for this reason it is obvious that if the tire is slightly in a deflated condition there is no danger of the rim cutting the tire and causing a blow out at this point. Thus it will be seen that a simple efficient reinforcing arrangement has been provided for the tire casing which prevents blow outs and punctures and thus lengthens the life of the inner tube as well as eliminates the annoyance of repairing the tire incident to blow outs. The tire may be worn down until the breaker plates are exposed without any injury having been done to the inner tube. It will also be noted that the elements are simple in construction and also have very simple and yet very efficient connecting means, thus holding the several elements against shifting, also it is obvious that if so desired some adhesive material may be employed for forming the one-piece non-shifting construction.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a tire casing consisting of a plurality of plies of material having beads thereon, yieldable armor inserted between said plies of material in alinement with the tread of the casing, yieldable armor carried upon said beads, and flexible sheets of material bearing upon each other and being spaced apart adjacent their side edges, said spaced apart portions overlapping the edges of the yieldable armor of the tread and of the beads, and means for connecting said flexible sheet to said yieldable armor, thus connecting the yieldable armor together, although allowing the casing to easily yield at a point intermediate the yieldable armor, due to the flexible construction of these sheets.

2. In a device of the class described, the combination of a tire casing formed of plies of material and having beads thereon, breaker plates interposed between said plies of material in alinement with the tread of the tire, bead plates carried by said beads, sheets of fabric bearing upon each other and being interposed between said plies of material, said fabric sheets being spaced apart, adjacent their side edges to overlap and fit upon the side edges of said breaker plates and bead plates, and rivets passing through said plies of material, said fabric sheets and said plates, thus connecting these elements together, whereby the casing will be reinforced in alinement with the tread and also at the beads, although the casing may easily yield at a point intermediate the breaker plates and the bead plates, due to the flexible nature of the fabric sheets.

3. In a device of the class described, the combination of a casing including beads having cores, said cores being recessed at the rim engaging surface, and bead plates conforming in contour to said cores and fitting within said recesses, thus reinforcing the beads and at the same time presenting an even wearing surface upon the cores.

In testimony whereof I affix my signature in presence of two witnesses.

PERLEY L. HEDGES.

Witnesses:
  PEARLE T. POLK,
  A. C. ANDERSON.